United States Patent [19]

Johnson

[11] Patent Number: 4,478,040
[45] Date of Patent: Oct. 23, 1984

[54] DUAL AREA NOZZLE ACTUATING MECHANICAL ACTUATION SYSTEM

[75] Inventor: Dell A. Johnson, Nibley, Utah

[73] Assignee: Thiokol Corporation, Chicago, Ill.

[21] Appl. No.: 425,609

[22] Filed: Sep. 28, 1982

[51] Int. Cl.³ .............................................. F02K 9/12
[52] U.S. Cl. ...................................... 60/225; 60/242; 60/250; 188/67
[58] Field of Search ................. 60/225, 234, 242, 245, 60/250, 254, 271; 239/265.15, 265.19, 265.29, 265.33; 188/67; 92/29

[56] References Cited

U.S. PATENT DOCUMENTS

| 3,011,309 | 12/1961 | Carter | 60/242 |
| 3,182,447 | 5/1965 | Bell | 60/250 |
| 3,230,704 | 1/1966 | Lovingham | 60/260 |
| 3,495,408 | 2/1970 | Frey | 60/250 |
| 3,914,935 | 10/1975 | Burkes | 60/250 |
| 4,109,867 | 8/1978 | Ebeling | 60/242 |

FOREIGN PATENT DOCUMENTS 2277982  2/1976  France ................. 60/245

Primary Examiner—Louis J. Casaregola
Attorney, Agent, or Firm—Gerald K. White

[57] ABSTRACT

In a dual area nozzle automatic mechanical actuation system for a boost-sustain solid propellant rocket motor, a pressure differential is created on the opposite sides of a ball-catch retaining ring when a fast-burning portion of the solid-propellant grain is spent and a slow-burning portion is ignited that allows the blow-out load on the smaller throat orifice of a mechanically restrained movable nozzle section to move the movable nozzle section to seat the smaller throat orifice against the larger throat orifice of a fixed nozzle section.

5 Claims, 3 Drawing Figures

DUAL AREA NOZZLE ACTUATING MECHANICAL ACTUATION SYSTEM

BACKGROUND OF THE INVENTION

1. Field of the Invention

This invention relates to an automatic actuation system for dual area nozzle assemblies of solid propellant rocket motors for effecting a reduction in the size of the nozzle throat area as required to provide for a long duration sustain phase of motor operation upon completion of an initial boost phase.

2. Description of the Prior Art

Solid propellant rocket motors, in certain applications, require a high thrust boost phase for enabling the rocket to reach the desired altitude and cruising velocity quickly. The velocity and altitude can then be maintained by a longer duration low thrust sustain phase.

The thrust produced by a rocket motor is controlled by the size of the throat area of the rocket motor nozzle and by factors related to the propellant that is used. In rocket motors using a single nozzle and a single combustion chamber, proposals have been made to achieve the difference in thrust level between the boost and sustain phases by appropriate selection of the propellant material and/or grain design. It is not always convenient or possible, however, to achieve the required thrust level ratio in this manner.

Dual thrust rocket motors employing a separate combustion chamber and a separate nozzle for each of the boost and sustain charges are also known. An especially serious objection to this method of providing the required dual thrust is the large weight penalty that is involved.

Dual thrust rocket motors utilizing a single combustion chamber and a nozzle assembly comprising boost and sustain nozzles for varying the size of the nozzle throat area for boost and sustain operation of the motor have also been proposed in the prior art. Rocket motors of this type are disclosed in the following U.S. Pat. Nos.: 3,182,447, H. S. Bell, Jr., 3,011,309, J. M. M. Carter, and 3,230,704, J. J. Lovingham.

In each of the Bell and Carter patents, the combustion chamber of a solid propellant rocket motor terminates at its aft end in a dual area nozzle assembly. The nozzle assembly includes a movable section that is mechanically movable upon completion of the boost phase. That is to say, the movable section is moved aft from a forward position in which it is mechanically restrained during the boost phase. When the movable section is in its forward position, another nozzle section provides the nozzle area required for the boost phase. When moved aft from the forward position, the movable section provides a smaller nozzle area for operation of the motor in a sustain phase.

The Bell patent nozzle assembly includes a booster expansion nozzle and a smaller tubular sustain nozzle that is concentric with the booster nozzle. Axially extending annularly spaced slots are provided in the sustain nozzle through which combustion gases pass during the boost phase, the sustain nozzle then being in a forward position in the combustion chamber. The sustain nozzle is slidably mounted in the combustion chamber and is movable aft to seat in and against the booster nozzle thereby closing and sealing the slots. In one embodiment gas from a high pressure source, not shown or described, is applied, presumably upon external command by means not described, to effect such sliding movement of the sustain nozzle when the booster phase of operations has been concluded. In other embodiments of the Bell patent, upon completion of the booster phase, gas pressure derived by means of conduits that project into a forward part of the solid booster propellant is used to actuate pistons that release detents which hold the sustain nozzle in the forward position. As the solid booster propellant is consumed, the forward ends of the conduits admit pressurizing gas to the pistons. Release of the detents allows the sustain nozzle to slide aft into seating engagement with the boost nozzle under pressure of the gases in the combustion chamber.

The nozzle assembly of the Carter patent includes a nozzle carrier, boost and sustain nozzles that are supported in the carrier in axial alignment with a hydraulic system that holds the sustain nozzle in a forward position, by-pass parts in the nozzle carrier which bypass the sustain nozzle and communicate with the boost nozzle, and a pressure sensitive valve. The pressure sensitive valve is operative at the end of the boost phase, as the combustion chamber as pressure falls, to expel the hydraulic fluid from the system whereby residual motor gas pressure at the end of the boost phase moves the nozzle carrier aft. This seals the by-pass parts in the carrier so that the motor gases can only pass out through the sustain nozzle. Additionally, ball detents holding the boost nozzle in place are released, allowing the boost nozzle to be jettisoned, thereby avoiding an unsuitable expansion ratio while the rocket motor is still at low altitude. In other embodiments in which the hydraulic system is described as preferably dispensed with, the nozzle carrier is released at the end of the boost phase responsively to the pressure drop in the rocket motor as sensed by a pressure sensitive device which sends a firing signal to a series of explosive bolts. This fractures the bolts leaving the nozzle carrier free to move aft under the joint influence of helical coil springs and the residual combustion chamber pressure.

In the Lovingham patent, the area of the thrust nozzle of a liquid propellant rocket motor is adjusted to provide boost and sustain operations by means of a pintle that is adapted to be moved from a boost phase position to a sustain phase position. Pending a command signal, the pintle is retained in a forward position by a ball detent. At the conclusion of the boost phase, a command signal fires a squib cartridge. This causes the release of the ball detent and movement aft of the pintle under the action of oxidizer tank nozzle pressure to reduce the area of the thrust nozzle for sustain operation.

Such prior art rocket motor actuatable nozzle assemblies and actuating structures and controls for providing an initial high thrust boost phase followed by a longer duration low thrust sustained phase are characterized by a number of inherent disadvantages. They are overly complicated and require complicated mechanisms or systems and pressure sensitive devices that add undesirably to the weight, space, resistance and cost of manufacture and assembly of the motor, and moreover, tend to increase the likelihood of operation failure.

Thus, there exists a need and a demand in the art for simplification and improvement in automatic means of actuating a mechanically restrained dual area nozzle assembly of a solid propellant rocket motor for operation in the sustain phase upon the conclusion of the boost phase.

SUMMARY OF THE INVENTION

Among the objects of the invention is to provide an improvement in automatic means of actuating a mechanically restrained dual area nozzle assembly of a solid propellant rocket motor for operation in the sustain phase upon the conclusion of the boost phase.

In accomplishing this and other objectives of the invention, the pressure decrease in the rocket motor combustion chamber at the end of the boost phase is utilized as a means of actuating the movable section of a dual area nozzle assembly. As a result of actuation, the movable section is moved from a forward position and is seated on a fixed section of the nozzle assembly, restricting gaseous flow to the smaller throat area of the movable section only.

In accordance with the invention, the movable section of a dual area nozzle assembly is supported for movement along the longitudinal axis of the rocket motor by round structural support members or struts. The support members, which may be employed in combinations of two, three or four, or other combinations as desired, extend into a cylindrical bore in the fixed section of the nozzle assembly. Each support member has an encircling groove or detent which accommodates a circular row of ball bearings that form a ball-catch retaining ring that mechanically restrains the movable nozzle section in a forward position during the burning of a fast-burning portion of the solid propellant grain.

Specifically, a projection or shoulder in the bore of the fixed section of the nozzle assembly supports the ball bearings on one side. On the other side, the bearings are retained by a ball retainer ring. The ball retainer ring is held in place by a compression spring which may be either a helical or coiled spring, belleville washers, or equivalent resilient structure. The spring has a predetermined load applied at assembly and is held in position by a vented retainer cap which is attached to the fixed section of the nozzle assembly.

Three pressure cavities in end-to-end relation, at least two of which are pressurized, are provided in association with each of the support members in the cylindrical bore in the fixed section of the nozzle assembly. A first pressure cavity comprises the space occupied by the coiled spring. A second pressure cavity comprises the space between the ball retaining ring and the projection in the bore of the fixed nozzle portion. The third cavity comprises the space between the end of the support member and the inner end of the bore in the fixed section of the nozzle.

One or more holes or passages in the retainer cap provide communication between the combustion chamber of the rocket motor and the first pressure cavity. Communication between the first pressure cavity and the second pressure cavity is provided through one or more holes or passages in the ball retainer ring or through the clearance annuli between the ball retainer ring and the wall of the bore in the fixed nozzle portion, and between the ball retainer ring and the support member. The communicating passages through or around the ball retainer ring are so sized that the net orifice flow area between the first and second pressure cavities is much smaller than the net orifice flow area between the first cavity and the motor combustion chamber. The combustion chamber pressure may or may not be applied to the third cavity, as desired. This is not dependent upon the operation of the actuation system, but may be employed as a dampening system for the support member during actuation.

When the fast-burning portion of the solid propellant rocket motor is ignited, the first pressure cavity is pressurized, through the holes in the retainer cap, to approximately the operating combustion chamber pressure of the motor. The second pressure cavity is pressurized, as described, either through one or more holes in the ball retainer ring, or through the clearance annuli between the ball retainer ring and the fixed nozzle cylindrical bore and between the ball retainer ring and the support member.

At the termination of the boost phase of motor operation, that is, when the fast-burning portion of the solid propellant grain is spent and the slow-burning portion is ignited, the combustion chamber pressure decreases rapidly. This causes the pressure in the first pressure cavity to decrease correspondingly rapidly. The pressure in the second pressure cavity is caused to decrease also, but at a slower rate due to the smaller orifice area between the first and second pressure cavities. At some finite point in the decline of the combustion chamber pressure, the force exerted on one side of the ball retainer ring by the pressure in the second pressure cavity exceeds the sum of the force exerted on the other wide of the retainer ring by the compressed coiled spring, and the pressure in the first cavity. This imbalance of forces causes the ball retainer ring to move away from the circular row of ball bearings, releasing the ball bearings and allowing them to move radially outwardly of the groove or detent in the support member, thus releasing the support member and allowing it to move into the third cavity due to the motor combustion chamber pressure acting on the inlet surface of the movable portion of the nozzle assembly. This results in seating of the movable nozzle section onto the fixed nozzle section thereby effecting a reduction in the size of the effective nozzle throat as required for a longer duration low thrust sustain phase of motor operation during the burning of the slow-burning solid propellant grain.

BRIEF DESCRIPTION OF THE DRAWINGS

Having summarized the invention, a detailed description follows with reference being had to the accompanying drawings which form part of the specification, of which.

DESCRIPTION OF THE PREFERRED EMBODIMENT

Figure 1:
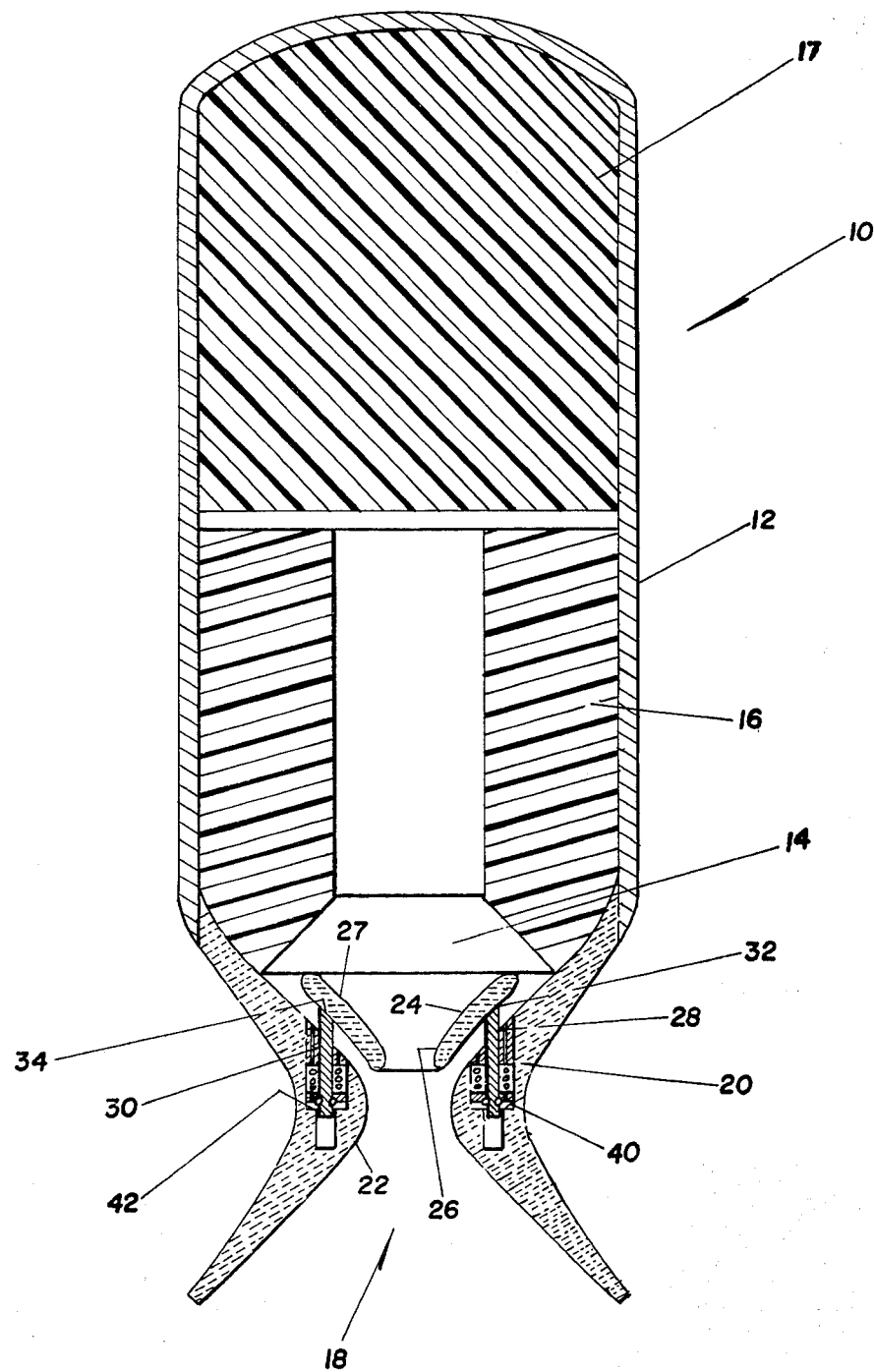
FIG. 1 is a central longitudinal, sectional view of a single chamber solid propellant rocket motor embodying the invention.

Referring to FIG. 1 of the drawings, the numeral 10 designates a rocket motor in which the invention is embodied. The rocket motor includes a tubular container 12 housing, a combustion chamber 14 containing a solid propellant grain comprising a star shaped fast-burning portion 16 for boost phase operation and a slow-burning portion 17 for sustain operation, and a dual area nozzle assembly indicated at 18 comprising a fixed nozzle section 20 at the convergent-divergent type having a throat 22, and a movable nozzle section 24, also of the convergent-divergent type, having a throat 26 and an inlet surface 27.

Figure 2:
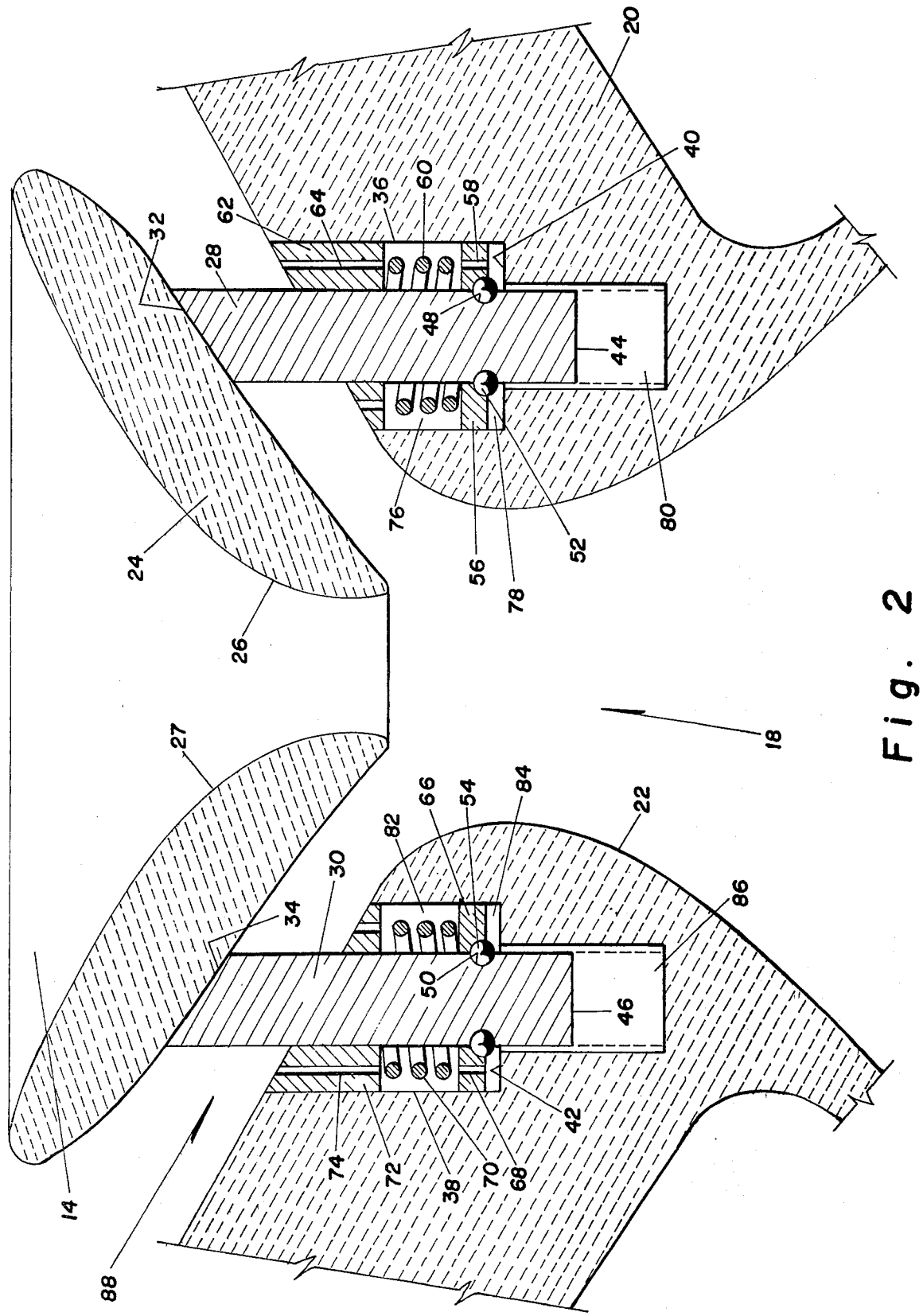
FIG. 2 is an enlarged fragmented sectional view of the nozzle of the rocket motor of FIG. 1 with the parts shown in position for high thrust boost phase motor operation.

The movable nozzle section 24 is supported for movement aft from the forward position shown by two substantially identical round structural support members or struts 28 and 30. Three of four such support members may be employed, if desired. The support members 28 and 30 are each locked in position by a ball-catch to be described to mechanically restrain the movable nozzle section 24 in the forward position shown during the boost phase of operation. Each of the support members or struts 28 and 30 is attached at a respective outer end 32 and 34 in any suitable manner to the nozzle section 24, at diametrically opposite sides thereof, and extends aft, parallel to the longitudinal axis of the motor 10, into a respectively associated bore 36 and 38, as shown best in FIG. 2, provided in the fixed nozzle section 20. For a portion of the length at the inner end thereof, the diameter of each of the bores 36 and 38 is less than the remaining portion of the bore adjacent the inward side of the fixed nozzle section 20. As a result there is provided a projection or shoulder 40 in bore 36 and a similar shoulder 42 in bore 38.

Each of the support members 28 and 30 is provided near its inner end 44 and 46 respectively, with a respective encircling recessed area, groove or detent 48 and 50. Groove 48 accommodates a circular row of ball bearings 52. Similarly, groove 50 accommodates a circular row of ball bearings 54.

Supporting the circular row of ball bearings 52 on one side, the side adjacent the end 44 of supporting member 28, is the shoulder 40 that is provided in the bore 36. On the other side, the bearings 52 are supported by a ball retainer ring 56. The retainer ring 56 has one or more vent holes or passages 58 of relatively small orifice area therein and is biased into engagement with the bearings 52 by a helical or coiled compression spring 60. The spring 60, in turn, is held in position by a retainer cap 62. Retainer cap 62 has vent holes or passages 64 therein, the vent holes 64 being selected to provide a much larger flow area than the vent holes 58 in retainer ring 56. The retainer cap 62 is attached in any suitable manner to the fixed nozzle section 20, in the bore 36, desirably being sealed therein.

Similarly, the circular row of ball bearings 54 is supported on one side, the side adjacent the end 46 of supporting member 30, by the shoulder 42 in the bore 38, and by a ball retainer ring 66 on the other side, the ring having one or more vent holes or passages 68 of relatively small orifice area therein. The retainer ring 66 is biased into engagement with the bearings 54 by a helical or coiled compression spring 70, the latter, in turn being held in position by a retainer cap 72. Retainer cap 72 has vent holes or passages 74 therein and is suitably attached in sealing manner, in bore 38, to the fixed nozzle section 20. Vent holes 74 in the retainer cap 72 provide a much larger orifice flow area than the vent holes 68 in the retainer ring 66.

The arrangement in each of bores 36 and 38 of a circular row of ball bearings, a retainer ring, a coiled spring, and a retainer cap provides three pressure cavities in end-to-end relation in association with each of the supporting members 28 and 30. Specifically, cavities 76, 78 and 80 are provided in association with supporting member 28, and cavities 82, 84 and 86 are provided in association with supporting member 30.

With the components assembled as shown in FIG. 2, each of the compression springs 60 and 70 has a predetermined load applied at assembly.

Upon ignition of the star shaped fast-burning propellant portion 16 in chamber 12 of motor 10, pressure cavities 76, 82, 78 and 84 are pressurized to approximately the operating pressure of the combustion chamber 14 of motor 10. Thus, cavity 76 is pressurized through the vent holes 64 and cavity 82 is pressurized through the vent holes 74. Cavity 78 is pressurized through the vent hole 58 and through the clearance annuli between the retainer ring 56 and the supporting member 28 and the cylindrical wall of bore 36. Similarly, cavity 84 is pressurized through the vent hole 68 and through the clearance annuli between the retainer ring 66 and the supporting member 30 and the cylindrical wall of bore 38.

In accordance with the invention, the net orifice flow area between cavities 76 and 78 and between cavities 82 and 84 is much less than the net orifice flow area between the respectively associated cavities 76 and 82 and the motor combustion chamber 14.

The pressure of the combustion chamber 14 may be applied to each of the cavities 80 and 86, as desired. This is optional as operation of the automatic actuation system for the movable nozzle section 24 does not depend upon whether or not the cavities 80 and 86 are pressurized. Pressurization of the cavities 80 and 86 to the pressure of the combustion chamber 14 may be usefully employed, however, to provide a dampening means for the respective supporting members 28 and 30.

In the operation of the rocket motor 10, the boost phase rapidly burning star shaped propellant portion 16 is first ignited. The gases forming the products of combustion pass through the annular space indicated at 88 in FIG. 2 between the movable nozzle 24 and the fixed nozzle 20, and past the oppositely disposed supporting members 28 and 30, as well as through the throat 26 of the movable nozzle section 24, and then out through the throat 22 of the fixed nozzle section 20. Upon termination of the boost phase of operation of the rocket motor 10, that is, when the star shaped propellant portion 16 has been substantially consumed, the pressure in the combustion chamber 14 decreases rapidly. There is a corresponding rapid decrease in the pressure in each of pressure cavities 76 and 82, and a delayed decrease in the pressure in each of the cavities 78 and 84. The delay in the decrease in pressure in cavities 78 and 84 is due to the orifice areas in the vent holes between the respective cavities 76, 78 and 82, 84 being smaller than the orifice areas between each of cavities 76 and 82 and the combustion chamber 14.

Figure 3:
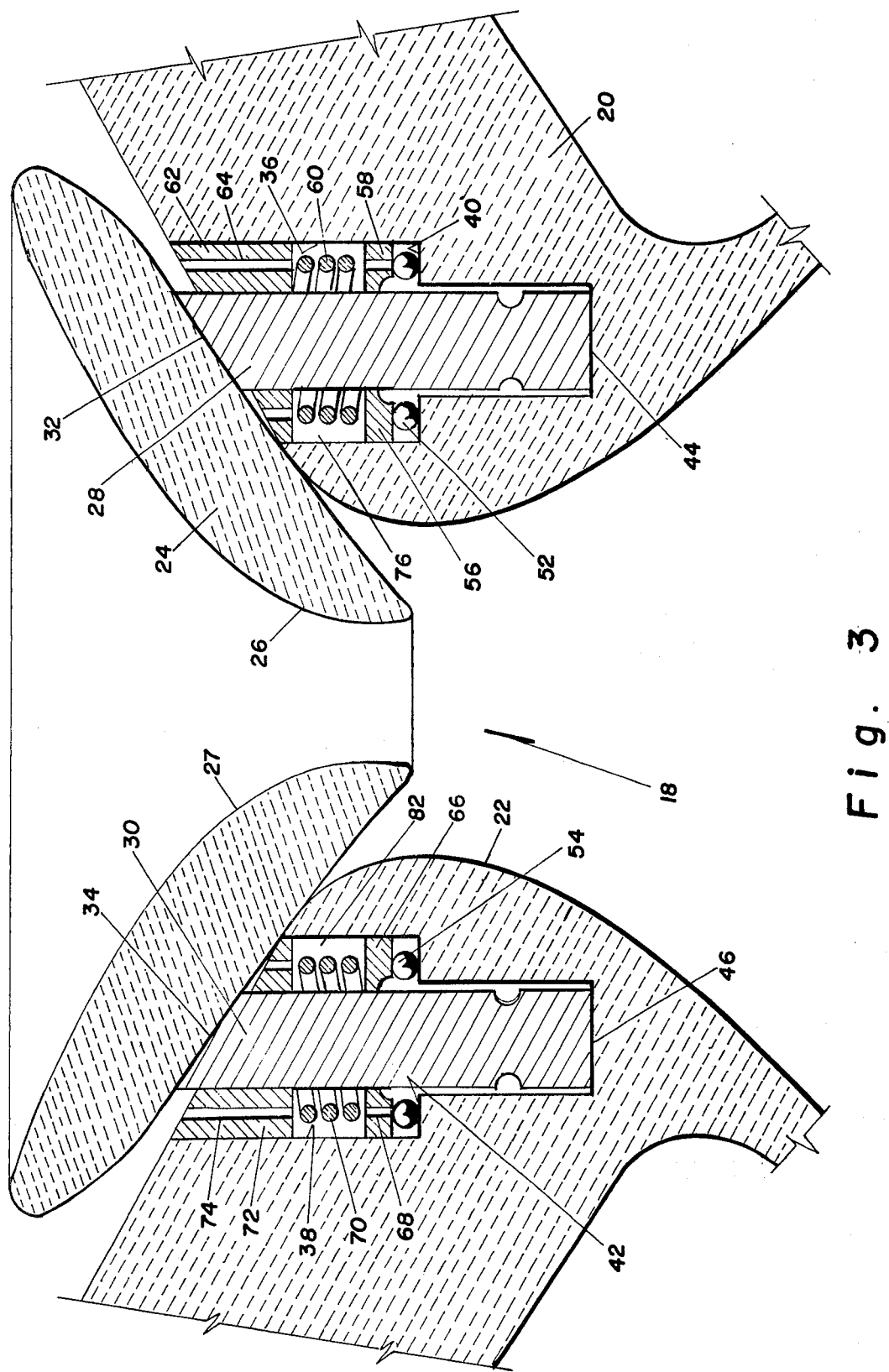
FIG. 3 is an enlarged fragmented sectional view similar to FIG. 2 but with the parts in position for low thrust sustain phase motor operation.

At a finite point in the decline of the pressure of the combustion chamber 10, the pressure in each of the cavities 78 and 84 causes the force on the adjacent side of the respectively associated ball retainer ring 56, 66, to exceed the total force on the other side thereof of the associated compression spring 60, 70 and the pressure in the respectively associated cavity 76, 82. The difference or imbalance in forces causes the ball retainer rings 56 and 66 to be moved away from the circle of ball bearings 52 and 54 respectively associated therewith. Movement of retaining ring 56 away from the circle of ball bearings 52 releases the bearings 52 from the groove or detent 48 and allows them to be moved radially outwardly from the supporting member 28, as shown in FIG. 3. This releases the member 28 and allows it to be moved longitudinally inwardly of the fixed nozzle section 20, in bore 36, under the force or blow out load of the pressure of the combustion chamber 14 acting on the inlet surface 27 and smaller throat 26 of the movable nozzle section 24.

Substantially, simultaneous movement of the retaining ring 66 away from the circle of ball bearings 54 releases the bearings 54 from the groove or detent 50 and allows them to be moved radially outwardly from the supporting member 30. The release of member 30 allows it to be moved longitudinally in bore 38 inwardly of the fixed nozzle section 20. This movement also is under the force of the residual pressure of the combustion chamber 14 acting on the inlet surface 27 of the movable nozzle section 24.

Such movement of the supporting members 28 and 30 inwardly of the fixed nozzle section 20 results in the movable nozzle section 24 being seated onto the fixed nozzle section 20, as illustrated in FIG. 3. With the movable nozzle section 24 so seated on the fixed nozzle section 20, the smaller area of throat 26 of the movable nozzle section becomes the effective throat of the nozzle assembly 18 instead of the larger area of throat 26 of the fixed nozzle section 20. As a result, the flow of exhaust gases outwardly from the combustion chamber 14 is throttled, that is, the flow of exhaust gas is reduced.

With the seating of the movable nozzle section 24 on the fixed nozzle section 20, the slow-burning propellant portion 17 is ignited and commences to furnish combustion gases at a throttled rate, the star shaped propellant 16 having been consumed, thereby establishing the sustain phase of operation of motor 10.

Thus, there has been provided according to the invention, an improvement in automatic means of actuating a mechanically restrained dual area nozzle of a solid propellant rocket motor 10 for boost phase operation initially and in the sustain phase upon the conclusion of the boost phase, the pressure decrease in the motor combustion chamber when the fast-burning portion of the solid propellant grain is spent and a slow-burning portion ignited, being utilized to create a pressure differential on the opposing sides of a ball-catch retaining ring that releases the movable section of the dual area nozzle and allows the blow-out load on the smaller throat orifice to seat the movable nozzle section against the larger throat orifice of the fixed nozzle section.

What is claimed is:

1. An automatic mechanical actuation system for a mechanically restrained supporting strut that is biased for endwise movement in a first direction by the pressure in a chamber as applied to a first end of said strut, comprising, means providing a bore having an internal shoulder formed therein, a circular row of ball bearings in said bore, one side of said row of ball bearings being supported by said shoulder in said bore, said strut having a second end that extends into said bore and having a circular groove formed thereon which accommodates said circular row of ball bearings, ball retainer ring means in said bore surrounding said supporting strut and supporting the other side of said circular row of ball bearings therein, said ball retainer ring means having by-pass vent means, compression spring means in said bore in engagement with the ball retainer ring means therein, and a retainer cap in said bore compressing said compression spring means to bias said ball retainer ring means to hold said circular row of ball bearings therein in the groove in said supporting strut, said retainer cap having vent means exposed to the pressure in the chamber, the by-pass vent means of said ball retainer ring means providing a much smaller orifice than the orifice of the vent means of said retainer cap, whereby the space in said bore occupied by said compression spring means forms a first pressure cavity in which the pressure responds rapidly to changes in the pressure in the chamber, and the space in said bore between said ball retainer ring and the shoulder therein forms a second pressure cavity that is in communication through said smaller orifice by-pass vent means with the first pressure cavity so that the response of the pressure in the second pressure cavity to a change in the pressure in the chamber is substantially slower than that of the first pressure cavity, and as a result upon decrease in the pressure in the chamber a pressure differential is created on the opposite sides of the ball retainer ring means in said bore that moves said ball retainer ring means to release the circular row of ball-bearings from the groove in the supporting strut thereby to allow residual pressure in the chamber to move said supporting strut endwise in said first direction.

2. An automatic mechanical actuation system for a mechanically restrained dual area nozzle assembly of a solid propellant rocket motor having a longitudinal axis and a combustion chamber disposed substantially symmetrical with respect to the motor axis and terminating in said nozzle assembly, the nozzle assembly including first and second nozzle sections of the convergent-divergent type that are disposed substantially concentric with the motor axis, the first nozzle section being fixed in position on the aft end of the combustion chamber and the second nozzle section having a throat of smaller area than that of the first nozzle section and being mounted for movement along the motor axis from an initial forward position to an aft position to seat on and against the first nozzle section, comprising, a plurality of spaced bores in the first nozzle section, each of said bores extending aft substantially parallel to the motor axis and having a shoulder formed therein, a circular row of ball bearings in each of said bores, one side of each of said rows of ball bearings being supported by the shoulder in the associated bore, a plurality of elongated supporting struts, each of said struts having a first end attached to the second nozzle section and a second end that extends into an individually associated one said bores with a circular groove formed on a portion thereof which accommodates the circular row of ball bearings in said bore, ball retainer ring means in each of said bores surrounding the supporting strut and supporting the other side of the circular row of ball bearings therein, each of said ball retainer ring means having by-pass vent means, compression spring means in each of said bores in engagement the ball retainer ring means therein, and a retainer cap in each of said bores compressing the compression spring means to bias said ball retainer ring means to hold the circular row of ball bearings therein in the groove in the associated supporting strut, each of said retainer caps having vent means exposed to the combustion chamber pressure, the by-pass vent means of each of said ball retainer ring means providing a much smaller orifice than the orifice of the vent means of each of said retainer caps, whereby the space in each of said bores occupied by said compression spring forms a first pressure cavity in which the pressure responds relatively rapidly to changes in the combustion chamber pressure, and the space in each of said bores between said ball retainer means and the shoulder therein forms a second pressure cavity that is in communication through said smaller orifice by-pass vent means with the first pressure cavity so that the response of the pressure in the second pressure cavity to a change in combustion chamber pressure is substantially slower than that of the first pressure cavity, and as a result, upon decrease in the combustion chamber pressure at the end of a boost phase of motor operation a pressure differential is created on the opposite sides of the ball retainer ring means in each of said bores that moves each of said ball retainer means to release the associated circular row of ball bearings from the groove in the associated strut thereby to allow the residual combustion chamber pressure to move the second nozzle section to seat the smaller area throat orifice thereof against the larger throat orifice of the fixed nozzle section for operation of a motor in the sustain phase.

3. An automatic mechanical actuation system as specified in claim 2 wherein combustion chamber pressure is applied to the space between the second end of each of said supporting struts and the inner end of the associated bore thereby to provide a dampening system for the movement of the supporting struts for said second nozzle section during actuation for operation of the motor in the sustain phase.

4. A rocket motor having a longitudinal axis comprising means defining a combustion chamber, a first nozzle,
a second nozzle concentric with said first nozzle, said second nozzle being mounted in said combustion chamber for movement along the longitudinal axis of said motor from a forward position to an aft position to seat on and against said first nozzle, and
means for mechanically restraining said nozzle in said forward position in said combustion chamber comprising
a plurality of spaced bores in said first nozzle, each of said bores extending aft substantially parallel to the longitudinal axis of the motor and having a shoulder formed internally thereof,
a circular row of ball bearings in each of said bores, the shoulder in each of said bores supporting the associated row of ball bearings on one side,
a plurality of elongated supporting struts, each of said supporting struts having one end attached to said second nozzle and the other end extending into an individually associated one of said bores, each of said supporting struts having a circular groove formed thereon which accommodates the circular row of ball bearings in the associated bore,
ball retainer ring meahs in each of said bores surrounding the supporting strut therein and support-
ing the circular row of ball bearings therein on the other side; each of said ball retainer ring means having an orifice passage by-pass,
compression spring means in each of said bores,
retainer cap in each of said bores holding the associated compression spring means in position to bias said ball retainer ring means into engagement with the associated circular row of ball bearings for holding said bearings in the groove of the associated supporting strut, each of said retainer caps having a vent orifice therein through which a first cavity occupied by said compression spring means is exposed to the pressure in said combustion chamber, and
each of said ball retainer ring means having a vent orifice therein through which a second cavity formed between said ball retainer means and the shoulder in each of said bores is exposed to the pressure in said first cavity, the vent orifice in each of said ball retainer means being much smaller than that in each of said retainer caps whereby a pressure differential is created between the pressures in said first and second cavities tending to move said ball retainer means away from each of said circular rows of ball bearings upon decrease in the pressure in said combustion chamber.

5. A rocket motor having a longitudinal axis comprising, a dual area nozzle assembly,
means defining a combustion chamber that is substantially symmetrical with respect to the longitudinal axis of the motor, said combustion chamber terminating in said dual area nozzle assembly,
said dual area nozzle assembly including first and second nozzles of the convergent-divergent type that are disposed substantially symmetrical with the longitudinal axis of the motor, said first nozzle being fixed in position at the aft end of said combustion chamber, and said second nozzle having a throat of smaller area than that of said first nozzle and being mounted in said combustion chamber for movement along the longitudinal axis of the motor from an initial forward position to an aft position to seat on and against said first nozzle,
a solid propellant grain in said combustion chamber for generating gases to be exhausted through said dual area nozzle assembly, said solid propellant grain including a fast-burning portion and a slow-burning portion, said fast burning portion being adapted to be ignited for boost phase operation of the motor and substantially spent prior to ignition of said slow-burning portion,
means for supporting and mechanically restraining said second nozzle in said forward position in said combustion chamber for boost phase operation of the motor comprising,
a plurality of spaced bores in said first nozzle, each of said bores extending aft substantially parallel to the longitudinal axis of the motor and having a shoulder formed internally thereof,
a circular row of ball bearings in each of said bores, one side of each of said rows of ball bearings being supported by the shoulder in the associated bore,
a plurality of elongated supporting struts, each of said struts having an end attached to said second nozzle and a portion thereof extending into an individually associated one of said bores with a circular groove formed thereon which accommodates the circular row of ball bearings therein, ball retainer ring means in each of said bores surrounding the supporting strut therein and supporting the other side of the circular row of ball bearings therein, each of said ball retainer ring means having a by-pass vent, compression spring means in each of said bores in engagement with the ball retainer ring means therein, a retainer cap in each of said bores compressing the compression spring means to bias and ball retainer ring means to hold the circular row of ball bearings therein in the groove in the associated supporting strut, each of said retainer caps having vent means exposed to the combustion chamber pressure, the by-pass vent of each of said ball retainer ring means providing a substantially smaller orifice than the orifice of the vent means of each of said retainer caps, the space in each of said bores occupied by the compression spring therein forming a first pressure cavity in which the pressure responds rapidly to changes in the combustion chamber pressure, and the space in each of said bores between said ball retainer ring means and the shoulder therein forming a second pressure cavity that is in communication through said smaller orifice by-pass vent with said first pressure cavity so that the response of the pressure in said second pressure cavity to pressure changes in said combustion chamber is much slower than that of the pressure response of said first pressure cavity, whereby when said fast-burning propellant grain portion is spent and the slow-burning grain portion is ignited, the resulting decrease in combustion chamber pressure causes a pressure differential in the pressures in said first and second cavities in each of said bores that is effective to move the ball retainer ring means therein away from the associated circular row of ball bearings thus releasing the associated supporting strut and allowing combustion chamber pressure on said second nozzle to seat the smaller throat thereof against the larger throat of said first nozzle for sustain phase operation of the motor.

* * * * *